United States Patent [19]

Brenke et al.

[11] Patent Number: 4,931,093

[45] Date of Patent: Jun. 5, 1990

[54] MARKER OR FELT TIP PEN

[75] Inventors: Matthias Brenke; Detlef Koch, both of Hamburg, Fed. Rep. of Germany

[73] Assignee: Rotring-Werke Riepe KG, Hamburg, Fed. Rep. of Germany

[21] Appl. No.: 282,643

[22] Filed: Dec. 12, 1988

[30] Foreign Application Priority Data

Dec. 31, 1987 [DE] Fed. Rep. of Germany ....... 3744635

[51] Int. Cl.$^5$ .............................................. C09D 11/16
[52] U.S. Cl. ........................................ 106/19; 106/20
[58] Field of Search .............................. 106/19, 20, 22

[56] References Cited

U.S. PATENT DOCUMENTS 3,945,837  3/1976  Miyata et al. .................... 106/22
4,281,329  7/1981  Yano et al. ....................... 106/20

Primary Examiner—Paul Lieberman
Assistant Examiner—Helene Klemanski
Attorney, Agent, or Firm—David H. Semmes

[57] ABSTRACT

A marker for felt tip pen for use on absorbent drawing materials contains an ink composition based on alkylene carbonates, or mixtures of alkylene carbonates and alkyl carbonates, as relatively high-boiling organic solvents; a water-soluble or water-dispersable dye that is virtually insoluble in the organic solvent; and water.

5 Claims, No Drawings

MARKER OR FELT TIP PEN

FIELD OF THE INVENTION

The invention relates to a marker or felt tip pen for use on absorbent materials to be written or drawn upon, above all paper. In particular, the invention relates to layout markers, which make it possible to apply different colors over a large surface area on writing or drafting material.

BACKGROUND OF THE INVENTION

The layout markers now on the market contain an ink composition based on toluol or, in particular xylol, with an oilsoluble dye, or dye soluble in organic solvents. Such markers are quite usable, because they are available in various colors; also, relatively large surface areas can be covered with them, without causing rippling of the drafting material. However, xylol and toluol both have grave disadvantages in terms of health: The solvent vapors have a penetrating odor, and hence often cause nausea or dizziness, and lead to a severe irritation of the mucous membranes, especially in the nose, mouth and throat, as well as in the eyes. Moreover, many people have an allergic reaction (skin inflammation) to these solvents. Pathological changes in the bone marrow can even occur if xylol vapors are inhaled over relatively long periods of time, especially with occupational use of such markers.

German Examined Application DE-AS 23 35 955, in order to overcome this problem, proposes an ink composition for a marker which contains certain modified dyes as well as resin-like binders, in an alicyclic hydrocarbon solvent. However, such ink compositions are not entirely satisfactory from the user's standpoint, because the markers filled with them rapidly dry out if the solvent is highly volatile; on the other hand, if solvents of higher boiling points are used, the ink dries too slowly on the drawing material. The complexity of production is a further consideration, because dyes available on the market cannot be used as is, but instead must be chemically modified first.

A jet printing ink known from German Patent 29 24 861 contains a dye or pigment in a liquid vehicle, which comprises a monovalent or multivalent alcohol or an alkanolamine, a nitrogen-containing five-member ring ketone or a lower mono- or dialkyl ether of an alkylene glycol, optionally water, and an aliphatic carbonic acid ester. The dye may be a water-soluble or water-insoluble dye, or pigments that are dispersed in the liquid vehicle can be used. Such jet printing inks are predominantly unsuitable for use in a marker or felt tip pen.

The same is true for the jet printing inks of unexamined German Application DE-OS 36 26 567, comprising a slightly water-soluble dye, water and an organic solvent having a boiling point of more than 120° C, which primarily means certain ethers. For the purposes of the invention, the low solubility of the dye in water is especially disadvantageous, since as a rule this solubility decreases still further with the admixture of the organic solvent.

OBJECT AND SUMMARY OF THE INVENTION

It is accordingly the object of the invention to develop markers or felt tip pens of the above-described type, in which the ink filling is free of toluol and xylol, yet which from the user's standpoint nevertheless have all the advantages of the xylol markers available on the market.

The subject of the invention is a marker or felt tip pen for use with absorbent writing and drawing materials, having an ink composition based on a relatively high-boiling organic solvent, a water-soluble or water-dispersable dye that is virtually insoluble in the organic solvent, and water; according to the invention, the ink composition contains, as an organic solvent, alkylene carbonates or mixtures of alkylene carbonates and alkyl carbonates having a boiling point at standard pressure of at least 200° C. and having a vapor pressure at 20° C. of less than 0.05 mbar.

The aqueous dye solution should be salt-free, to assure miscibility with the organic solvent. Unexpectedly, the dyes can dissolve in the water up to their maximum solubility, without producing sediment, if the organic solvent is added. Because of the presence of the organic solvent, the pens or markers according to the invention do not dry out even if they are left uncapped for relatively long periods. Their performance when used on absorbent writing and drawing materials, in particular papers having different degrees of sizing, is excellent: While the water evaporates quickly, the organic solvent is drawn by capillary action into the writing or drawing material; that is, the writing or coloring that is applied apparently "dries" rapidly. Since the dye is insoluble in the organic solvent, when the water evaporates the dye precipitates out at the surface of the drawing material, where it adheres firmly, yet it is not transported into the drawing material itself, so the contours of the drawing material do not change.

The carbonates selected as organic solvents according to the invention are advantageously distinguished from glycols and other multivalent alcohols. Glycols and other multivalent alcohols hardly penetrate the drawing material, so the coloring or writing is not smear-proof, but the alkyl and alkylene carbonates rapidly penetrate the drawing material. If they are applied by themselves to such drawing material, they have the appearance of a spot of grease.

A further advantage over glycols is that the alkyl and alkylene carbonates are not hygroscopic. This also contributes to the fact that the colored surfaces or written areas produced with the markers according to the invention dry more quickly (become smear-proof).

On the other hand, the water content of the ink compositions used in accordance with the invention can be kept relatively low, so that undesirable rippling of the drawing or writing material does not occur, even if relatively large areas must be colored in. Advantageously, only enough water as needed to dissolve an adequate quantity of dye is used.

Particularly preferred solvents include cyclic alkylene carbonates, in particular 1,3-dioxolan-2-one and 4-methyl-1,3-dioxolan-2-one. Suitable alkyl carbonates are in particular those having straight-chain or branch-chain alkyl radicals having from one to eight carbon atoms, in which the two alkyl radicals may be identical or different, on the condition that their boiling point is sufficiently high and their vapor pressure is sufficiently low. Since alkyl carbonates alone are immiscible with water, according to the invention either alkylene carbonates alone or mixtures of alkylene carbonates and alkyl carbonates are used, the mixture ratio being selected such that the water miscibility is still retained.

Many suitable water-soluble dyes or water-dispersed pigment substances are known to one skilled in the art.

Reference is made for instance to the lists provided in the aforementioned German Application 36 26 567, page 4, line 53 through page 5, line 3, and German Patent 29 24 861, page 8. Anionic or cationic dyes and direct dyes are particularly preferable.

The dye content in the ink composition is preferably from 1–20% by weight, in particular 1–10% by weight. The water content must be sufficient at least for complete dissolution or dispersion of the dye. As a rule, approximately from 10–30% and preferably approximately 10–25% by weight of water suffice for this purpose. The quantity of alkyl and/or alkylene carbonate makes up the remainder of the 100% by weight of the ink composition, preferably amounting to from 50–90 and in particular from 50–75% by weight.

Conventional additives can also be added to the ink composition. Among these are in particular conventional wetting agents, preferably non-ionic or anionic wetting agents such as nonylphenylpolyglycol ether, alkylpolyglycol ether, fatty acid polyglycol ester or fatty alcohol ethoxalates. Suitable preservatives include for instance ortho-phenolphenyl and its sodium salt, ortho-hydroxydiphenyl, 6-acetoxy-2,4-dimethyl-m-dioxane and others.

For more detailed explanation of the invention, the following examples are provided; the following ink compositions have been produced for layout markers (data given in parts by weight)

EXAMPLE 1

| | |
|---|---|
| 1,3-dioxolan-2-one | 52.0 |
| 4-methyl-1,3-dioxolan-2-one | 10.0 |
| $H_2O$ | 30.6 |
| Acid Red 87 (dye) | 7.0 |
| Mergal ® K7 (preservative) | 0.2 |
| nonylphenolpolyglycol ether (10% solution in $H_2O$) (Arkopal ® N 090) | 0.2 |
| | 100.0 |

EXAMPLE 2

| | |
|---|---|
| 1,3-dioxolan-2-one | 72.0 |
| 4-methyl-1,3-dioxolan-2-one | 2.0 |
| $H_2O$ | 20.8 |
| Direct Blue 86 (dye) | 5.0 |
| ortho-phenylphenol (Preventol ® D 3) | 0.2 |

-continued

| | |
|---|---|
| | 100.0 |

EXAMPLE 3

| | |
|---|---|
| 1,3-dioxolan-2-one | 70.0 |
| 4-methyl-1,3-dioxolan-2-one | 5.0 |
| $H_2O$ | 19.5 |
| Fine pigment dough COLANYL ® Green CG | 5.0 |
| Mergal ® K7 | 0.2 |
| nonylphenolpolyglycol ether (10% solution in $H_2O$) (Arkopal ® N 300) | 0.3 |
| | 100.0 |

A marker having one of these ink compositions does not dry out even if if left uncapped for relatively long periods. When used on paper, it produced well-defined lines and allows drawing without leaving unevenly shaded stripes, so that even relatively large surface areas can be colored uniformly. Rippling of the paper does not occur. Even relatively large surface areas dry quickly, so that drawing can continue, even on top of previously drawn areas, without long waiting periods.

What is claimed is:

1. A layout marker pen for use on absorbent writing and drawing materials having an ink composition based upon a relatively high boiling organic solvent comprising:
   (a) 1–20% by weight of a water soluble or water dispersable dye;
   (b) water at least sufficient for complete dissolution or dispersion of the dye, and
   (c) an organic solvent in the form of alkylene carbonate for supplementation to 100% by weight having a boiling point at standard pressure of at least 200° C., and having a vapor pressure at 20° C. of less than 0.05 mbar.

2. A marker or felt tip pen as defined by claim 1, characterized in that the ink composition contains 1,3-dioxolan-2-one or mixtures thereof as an organic solvent.

3. A marker or felt tip pen as defined by one of the claim 2, characterized in that the ink composition also includes wetting agents.

4. A marker or felt tip pen as defined by one of the claim 3, characterized in that the ink composition also contains preservatives.

5. A marker or felt tip pen as defined by one of the claim 4, characterized in that the aqueous base contains no salts except for the dye.

* * * * *